A. F. CLARK.
DRIVING MECHANISM FOR AUTOMOBILES.
APPLICATION FILED MAY 4, 1912.

1,050,761. Patented Jan. 14, 1913.

WITNESSES:
Rob't R. Titchel
E. E. Wall

INVENTOR
Absalom F. Clark
BY Frank L. Busser
ATTORNEY.

UNITED STATES PATENT OFFICE.

ABSALOM F. CLARK, OF PHILADELPHIA, PENNSYLVANIA, ASSIGNOR TO SIMON FRIEDBERGER, OF PHILADELPHIA, PENNSYLVANIA.

DRIVING MECHANISM FOR AUTOMOBILES.

1,050,761.  Specification of Letters Patent.  Patented Jan. 14, 1913.

Application filed May 4, 1912. Serial No. 695,160.

*To all whom it may concern:*

Be it known that I, ABSALOM F. CLARK, a citizen of the United States, residing at Philadelphia, county of Philadelphia, and State of Pennsylvania, have invented a new and useful Improvement in Driving Mechanism for Automobiles, of which the following is a full, clear, and exact description, reference being had to the accompanying drawings, which form a part of this specification.

The object of my invention is to support the driving mechanism for electrically-propelled automobiles in such manner as to simplify the connection between the motor and the driving axle and particularly to enable the universal joints in the propeller shaft between the motor and the driving axle and the auxiliary torsion tube construction to be dispensed with.

A further object of the invention is to so support the driving mechanism that it will take up or absorb the thrust of the driving axle.

My invention consists of straight line driving mechanism between the motor and the driving axle in which a rigid casing connects the motor and the differential gear casing on the axle and in which the motor is supported from the car body in such a way that it can yield longitudinally relatively to the car body and turn axially and thereby adapt itself to all ordinary strains to which it is subjected without interrupting or impairing its driving connection with the axle. Two preferred embodiments of the invention are shown in the accompanying drawings, in which—

Figure 1:
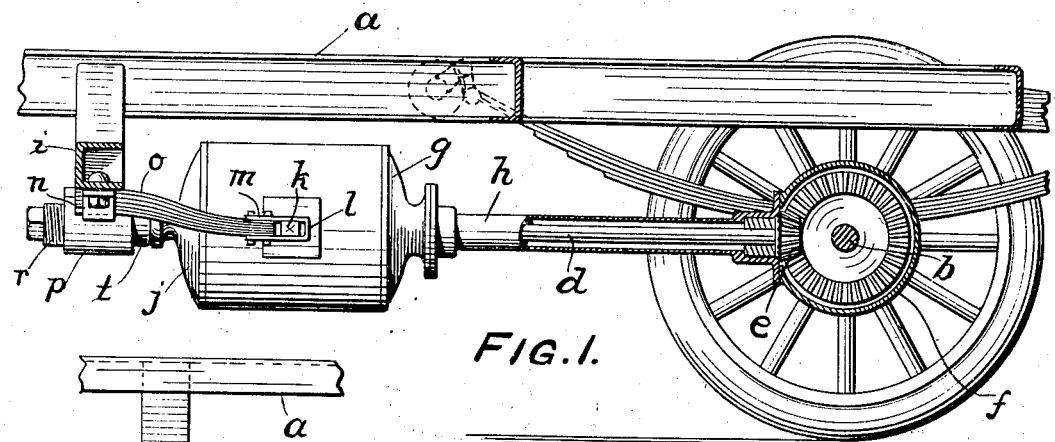
Figure 2:
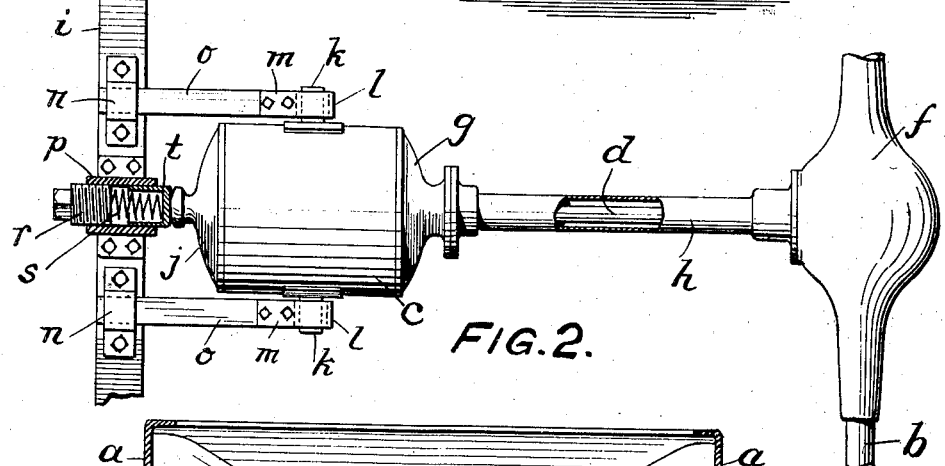
Figure 3:
Figure 4:
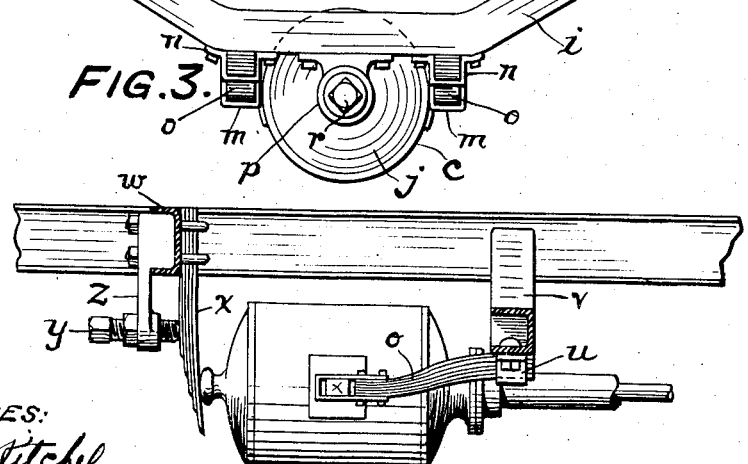

Figure 1 is a sectional view of a portion of an automobile showing an embodiment of my invention. Fig. 2 is an inverted plan view of same with part broken away. Fig. 3 is an end view looking from the left hand side of Fig. 1. Fig. 4 is a sectional elevation showing a modified form of my invention.

Referring first to the construction shown in Figs. 1, 2 and 3: $a$ is the frame of the automobile or other power propelled vehicle. $b$ is the rear axle. $c$ is the motor. $d$ is the longitudinally extending propeller shaft connected with the rotating element of the motor and extending therefrom to the bevel gearing $e$ by which the differential gearing on the axle $b$ is directly driven. $f$ is the casing for the differential gearing and $g$ a bell secured to the end of the motor nearest the axle $b$. $h$ is a casing for the propeller shaft, rigidly secured at opposite ends to the bell $g$ and casing $f$. On the car body, at the front of the motor $c$, is a U-shaped cross-piece $i$, from which the motor is supported in the following manner: Projecting from opposite sides of the motor are ears $k$, rectangular-shaped in cross-section, extending within guides $l$ formed in holders $m$. The guides are also rectangular shaped in cross-section, but are longer than the width of the ears, so as to permit the latter to slide in the guides. Secured to the cross-piece $i$ are holders $n$. Extending between and secured to the holders $m$ and $n$ on each side of the motor is a multiple leaf spring $o$. $j$ is a bell secured to the front end of the motor. Secured to the cross-piece $i$ is a sleeve $p$ the longitudinal center of which is in alinement with the axis of the motor. $r$ is an adjusting cap screwed into the end of the sleeve more remote from the motor. $t$ is a piston slidable in the sleeve and pressed forward toward the bell $j$ on the adjacent end of the motor by means of a spring $s$. This construction acts as a buffer to absorb the end thrust of the driving mechanism.

By the foregoing construction the motor is flexibly supported from the springs $o$ and is capable of rocking more or less on its axis by reason of the flexing of the springs $o$, which, at the same time serve as an adequate support for the motor. By reason of the capacity of the motor to slide longitudinally in the holders $n$, the thrust of the axle $b$ does not affect the motor support, and the buffer in front of the motor yielding resists, and absorbs, the end thrust of the driving mechanism.

The construction shown in Fig. 4 is the same as that just described except that the motor-supporting springs $o$ extend rearwardly from the motor instead of forwardly and are supported from holders $u$ secured to a cross-piece $v$ located at the rear of the motor. From a second cross-piece $w$, located at the front of the motor, extends downward a leaf spring $x$ which engages the front end of the motor. The spring $x$ is adjusted by means of an adjusting screw $y$ on a hanger $z$ depending from the cross-piece $w$. The operation of this embodiment of my invention is the same as that previously described for the other embodiment, the spring x performing the function of a buffer to absorb the end thrust of the driving mechanism.

Having now fully described my invention, what I claim and desire to protect by Letters Patent is:

1. The combination with the vehicle frame and the driving axle, of a motor, gearing engaging the axle, a shaft connecting the motor and gearing, the gear casing, a casing connecting the motor and gear casing, and flexible motor supports connected with the car frame and with the motor on opposite sides of its longitudinal axis and permitting the motor to move vertically relatively to the car frame, said connections comprising means permitting the motor to slide longitudinally relatively to the car frame.

2. The combination with the vehicle frame and the driving axle, of a motor, gearing engaging the axle, a shaft connecting the motor and gearing, the gear casing, a casing connecting the motor and gear casing, and flexible motor supports connected with the car frame and with the motor on opposite sides of its longitudinal axis and arranged to permit the motor to slide longitudinally relatively to the car frame, and a buffer adapted to yieldingly resist longitudinal movement of the motor.

3. The combination with the vehicle frame and the driving axle, of a motor, gearing engaging the axle, a shaft connecting the motor and gearing, the gear casing, a casing connecting the motor and gear casing, holders on which the motor is supported and longitudinally movable, and vertically yielding flexible connections between the vehicle frame and the holders by which the latter are supported.

4. The combination with the vehicle frame and the driving axle, of a motor, gearing engaging the axle, a shaft connecting the motor and gearing, the gear casing, a casing connecting the motor and gear casing, holders on which the motor is supported and longitudinally movable, vertically yielding flexible connections between the vehicle frame and the holders by which the latter are supported, and a buffer adapted to receive the end thrust of the driving mechanism.

5. The combination with the vehicle frame and the driving axle, of a motor, gearing engaging the axle, a shaft connecting the motor and gearing, the gear casing, a casing connecting the motor and gear casing, a cross-piece on the car frame in proximity to the end of the motor more remote from the driving axle, holders on opposite sides of the motor, ears on the motor slidable in guides on the holders, holders on the cross-piece, multiple leaf springs connecting respectively the pair of holders on opposite sides of the motor, and a buffer secured to the same cross piece and adapted to yieldingly resist longitudinal sliding movement of the motor.

6. The combination with the vehicle frame and the driving axle, of a motor, gearing engaging the axle, a shaft connecting the motor and gearing, the gear casing, a casing connecting the motor and gear casing, flexible motor supports connected with the car frame on opposite sides of the longitudinal center line of the motor and connections between the flexible motor supports and the motor including parts carried respectively by the motor and the supports and slidable one upon the other in the direction of the longitudinal extension of the car frame.

In testimony of which invention, I have hereunto set my hand, at St. Petersburg, Florida, on this 10th day of December, A. D. 1912.

ABSALOM F. CLARK.

Witnesses:
R. H. SUMNER,
CLARENCE H. NEIMYER.

Copies of this patent may be obtained for five cents each, by addressing the "Commissioner of Patents, Washington, D. C."